United States Patent
Walenty et al.

(10) Patent No.: US 6,553,304 B2
(45) Date of Patent: Apr. 22, 2003

(54) ANTI-LOCK BRAKE CONTROL METHOD HAVING ADAPTIVE INITIAL BRAKE PRESSURE REDUCTION

(75) Inventors: Allen John Walenty, Macomb, MI (US); Kevin Gerard Leppek, Rochester Hills, MI (US); David Alan Thatcher, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/882,795

(22) Filed: Jun. 18, 2001

(65) Prior Publication Data

US 2002/0193931 A1 Dec. 19, 2002

(51) Int. Cl.[7] .................................................. B60T 7/70
(52) U.S. Cl. ........................................................ 701/71
(58) Field of Search .......................... 701/69–76, 78–80, 701/82–83, 90–92; 303/9.67–9.71, 121, 132, 122.02, 122.06, 122.09, 148–150, 152–160, 167, 191, 174–176, 192, 89; 188/68–69, 174, 180, 181 R, 181 A, 181 C; 702/141, 145; 73/862.12

(56) References Cited

U.S. PATENT DOCUMENTS

| | | | | |
|---|---|---|---|---|
| 5,511,862 A | * | 4/1996 | Fujioka | 303/113.4 |
| 6,212,458 B1 | | 4/2001 | Walenty et al. | 701/51 |
| 6,254,203 B1 | * | 7/2001 | Arnold | 188/1.11 R |
| 6,309,031 B1 | * | 10/2001 | Crombez et al. | 303/113.4 |

* cited by examiner

*Primary Examiner*—Thu Nguyen
(74) *Attorney, Agent, or Firm*—Christopher DeVries

(57) ABSTRACT

An improved anti-lock brake control method in which the brake pressure reduction initiated upon detection of insipient wheel lock is adaptively determined based on a periodically updated characterization of the relationship between brake pedal position and vehicle deceleration. The brake torque and vehicle weight are estimated based on the characterization data, corrected for variation in brake heating, and used to compute the surface coefficient of friction, which in turn, is used to schedule the initial anti-lock brake pressure reduction for optimal braking system performance.

9 Claims, 4 Drawing Sheets

ANTI-LOCK BRAKE CONTROL METHOD HAVING ADAPTIVE INITIAL BRAKE PRESSURE REDUCTION

TECHNICAL FIELD

This invention relates to motor vehicle anti-lock brake systems, and more particularly to a control method that adaptively determines an initial brake pressure reduction to be initiated upon detection of insipient wheel lock.

BACKGROUND OF THE INVENTION

Motor vehicle anti-lock braking systems modulate hydraulic brake pressures upon detection of insipient wheel lock to maximize the tractive force between the vehicle tires and the road surface. The brake pressure is initially reduced by an amount based on an assumed coefficient of friction between the tires and road surface, and then re-applied once the wheel acceleration reaches a reference acceleration value. Since the coefficient of friction is ordinarily unknown, the initial pressure reduction is typically determined for a worst-case road surface, such as glare ice, even though this approach provides somewhat degraded braking performance on surfaces having a higher coefficient of friction. After the initial pressure reduction, the coefficient of friction is inferred based on the time required for the wheels to accelerate to the reference value, and the rate of pressure re-application is scheduled accordingly. Although the coefficient of friction can be initially estimated from the brake pressure or the brake pedal force, the sensors for obtaining such information significantly increase system cost, and the estimated coefficient of friction is subject to error under conditions where the relationship between brake pressure and brake torque deviates from the norm. Accordingly, what is needed is an inexpensive and reliable method of determining an initial brake pressure reduction that optimizes the performance of an anti-lock braking system.

SUMMARY OF THE INVENTION

The present invention is directed to an improved anti-lock brake control method in which the brake pressure reduction initiated upon detection of insipient wheel lock is adaptively determined based on a periodically updated characterization of the relationship between brake pedal position and vehicle deceleration. In a preferred embodiment of the invention, the brake torque and vehicle weight are estimated based on the characterization data, corrected for variation in brake heating, and used to compute the surface coefficient of friction, which in turn is used to schedule the initial anti-lock brake pressure reduction for optimal braking system performance.

DESCRIPTION OF THE PREFERRED EMBODIMENT

Figure 1:
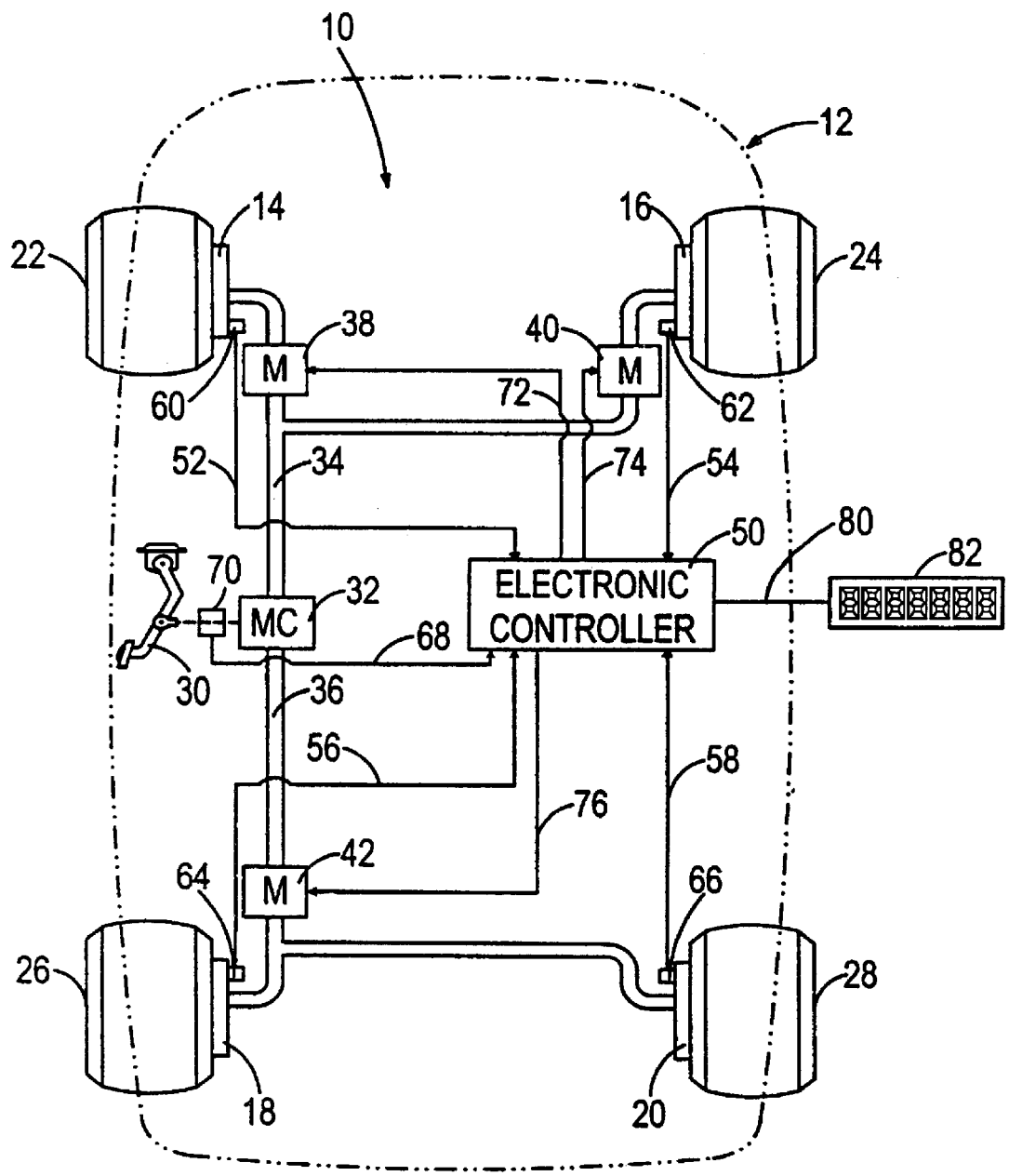
FIG. 1 is a schematic diagram of a vehicle anti-lock braking system, including a brake pedal position sensor, and a microprocessor-based control unit programmed to carry out the method of this invention.

Referring to FIG. 1, the present invention is disclosed in the context of an anti-lock braking system 10 for a vehicle 12 having hydraulically activated friction brakes 14, 16, 18, 20 at each of four vehicle wheels 22, 24, 26, 28. A driver-manipulated brake pedal 30 is mechanically coupled to a master cylinder (MC) 32 for producing hydraulic pressure in proportion to the force applied to pedal 30. Master cylinder 32, which may include a pneumatic booster (not shown), proportions the hydraulic pressure between front and rear brake supply lines 34 and 36 in a conventional manner. Front supply line 34 is coupled to the left front service brake 14 via left-front anti-lock modulator (M) 38, and to the right front service brake 16 via right-front anti-lock modulator (M) 40. Rear supply line 36 is coupled to the left and right rear wheel brakes 18, 20 via rear anti-lock modulator (M) 42.

A microprocessor-based control unit 50 receives various inputs, including wheel speed signals on lines 52, 54, 56, 58 from respective wheel speed sensors 60, 62, 64, 66 and a brake pedal position signal PP on line 68 from pedal position sensor 70. The sensors 60, 62, 64 66 and 70 may be implemented with conventional devices in a manner known to those skilled in the art. In response to the various inputs, the control unit 50 outputs modulator control signals on lines 72, 74, 76 during wheel lock-up conditions, and diagnostic information signals on line 80 for display on a driver information device 82.

In general, the control unit 50 monitors the measured wheel speeds to detect a condition of insipient wheel lock, and then controls modulators 38, 40, 42 to modulate the respective hydraulic brake pressures so as to maximize the tractive force between the vehicle tires and the road surface. When insipient wheel lock is detected, the modulators 38, 40, 42 are activated to effect a rapid initial reduction in the respective brake pressures for essentially eliminating wheel slip. Of course, the amount of pressure reduction required to achieve this objective varies with the coefficient of friction between the tires and road surface, and a low coefficient of friction is typically assumed since the actual coefficient of friction is ordinarily unknown. The reduction in brake pressure allows the wheels 22, 24, 26, 28 to accelerate, and the control unit 50 measures the time required for the wheel acceleration to reach a reference acceleration. The coefficient of friction is then inferred based on the measured time, and the modulators 38, 40, 42 are controlled to re-apply the respective brake pressures based on the inferred coefficient(s) of friction.

Clearly, the braking performance of the above-described control could be improved if the coefficient of friction between the tires and road surface could be known or reliably estimated prior to the initial pressure reduction. For example, if the coefficient of friction is relatively high, the initial pressure reduction can be relatively small, enabling rapid brake pressure re-application once the wheel acceleration reaches the reference acceleration. This issue is addressed by the present invention, which adaptively determines the surface coefficient of friction, and a corresponding initial brake pressure reduction to be initiated upon detection of insipient wheel lock. According to the invention, the coefficient of friction is computed based on brake torque and vehicle weight, which in turn, are adaptively determined based on a periodically updated characterization of the relationship between brake pedal position and vehicle deceleration, corrected for variation in brake heating.

Figure 2:
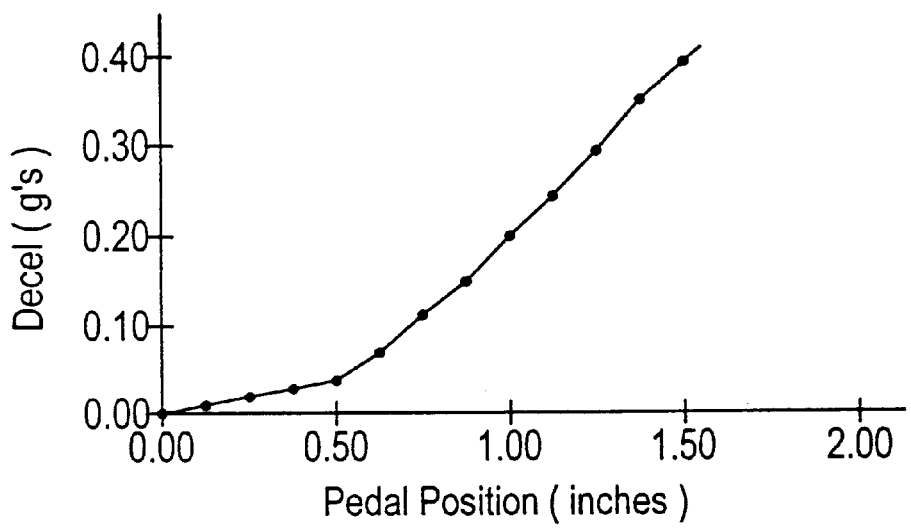
FIG. 2 is a graph depicting vehicle deceleration as a function of brake pedal position for the braking system of FIG. 1.
Figure 3:
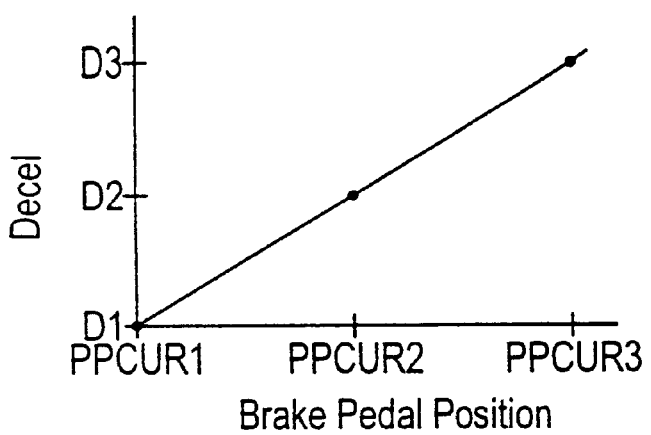
FIG. 3 is a graph depicting an exemplary characterization of brake system effectiveness according to this invention.

FIG. 2 graphically depicts a representative relationship between vehicle deceleration and brake pedal position for defined braking of the vehicle 12, assuming that there is no lock-up condition and the modulators 38, 40, 42 are inactive. Typically, the "knee" portion of the relationship varies considerably from stop to stop, whereas the portion of the relationship above the knee tends to be linear and repeatable from stop to stop. For this reason, the knee portion of the relationship is ignored for purposes of this invention, and the brake pedal position vs. vehicle deceleration relationship is characterized only for pedal positions and vehicle decelerations in the linear portion above the knee. In the illustrated embodiment, for example, the characterization data is collected by determining the pedal position corresponding to three different vehicle deceleration values identified in FIG. 3 as D1, D2 and D3. Of course, any number of data points may be used, and the data points may be defined in terms of pedal position, if desired. In any case, the braking data is only collected during braking operation when the pedal 30 is depressed at a "normal" rate or held at an essentially static position; data is not collected upon release of the pedal 30 or during panic braking. This eliminates the need to compensate for the effects of suspension and powertrain dynamics, tire and sensor dynamics, and so on. The vehicle acceleration at the onset of braking is saved and subtracted from the deceleration during braking operation in order to compensate for the effects of engine braking and road grade. Of course, the road grade and other factors such as vehicle weight and the effects of brake heating may be estimated and used to compensate the collected braking data; see, for example, the U.S. Pat. No. 6,212,458 to Walenty et al., issued on Apr. 3, 2001, and incorporated herein by reference. FIG. 3 graphically depicts a representative characterization table for braking system 10, based on pedal position values PPCUR1, PPCUR2 and PPCUR3, corresponding to respective vehicle deceleration values D1, D2 and D3.

The characterization table is periodically updated to reflect a current condition of the braking effectiveness, and the brake torque BRAKE_TQ for any brake pedal position PP greater than or equal to PPCUR1 can be determined according to the expression:

$$BRAKE\_TQ=[((PP-PPCUR1)*(PPCUR3-PPCUR1)/(D3-D1))*Kbt]+(UPDATE\_BRAKE\_HEAT-BRAKE\_HEAT)*Kht \quad (1)$$

where Kbt is a brake torque constant, UPDATE_BRAKE_HEAT is the estimated brake temperature when the characterization table was last updated, BRAKE_HEAT is a current estimate of the brake temperature, and Kheat is a constant for converting the quantity (UPDATE_BRAKE_HEAT-BRAKE_HEAT) to a corresponding difference in brake torque. Thus, the brake torque obtained from the characterization table is compensated for differences in brake temperature; for example, BRAKE_TQ is reduced if BRAKE_HEAT is higher than UPDATE_BRAKE_HEAT, and vice versa.

The brake temperature term BRAKE_HEAT can be modeled reasonably well, and is continuously updated regardless of whether the brakes are activated. For example, BRAKE_HEAT may be estimated as:

$$BRAKE\_HEAT=BRAKE\_HEAT-((VSPD+K1)^2*K2)*(BRAKE\_HEAT-(BRAKE\_HEAT*Tamb)+(BRAKE\_TQ*Kheat*VSPD)*(K3-BRAKE\_HEAT)/K3 \quad (2)$$

where K1, K2 and K3 are constants, Tamb is the ambient temperature, and VSPD is the vehicle speed.

Since changes in the vehicle weight change the characterization table data, the vehicle weight is updated each time the braking characterization table is updated, according to:

$$V\_WT=V\_WT(last)+WT\_DELTA \quad (3)$$

where WT_DELTA is a measure of the change in characterization data, compensated for changes in brake temperature. Specifically, WT_DELTA is given by the expression:

$$WT\_DELTA=[((PPCUR3old-PPCUR1old)-(PPCUR3-PPCUR1))/(D3-D1))*Kwt]+(UPDATE\_BRAKE\_HEAT-BRAKE\_HEAT)*Kheat \quad (4)$$

where PPCUR3old and PPCUR1old are brake pedal position values of the previous brake characterization table and where Kwt is a weight constant. In turn, the coefficient of friction between the vehicle tires and the road surface (SURFACE_MU) is given by:

$$SURFACE\_MU=(BRAKE\_TQ/V\_WT)*Kmu \quad (5)$$

where Kmu is a constant. In the illustrated embodiment, the road grade (GRADE) is also estimated, as it affects weight transfer as between the front and rear wheels 22/24, 26/28. For example, GRADE may be estimated according to the expression:

$$GRADE=ROLL\_RES+AERO\_DRAG+ENG\_BR+BRAKE\_TQ+ACCEL \quad (6)$$

where ROLL_RES is the rolling resistance, AERO_DRAG is the aerodynamic drag, ENG_BR is the engine braking torque, and ACCEL is the vehicle acceleration. Using SURFACE_MU and GRADE, the front and rear initial brake pressure release values IPRfrt, IPRrear may be calculated as follows:

$$IPRfrt=PRmax\_f*(1-SURFACE\_MU-(GRADE*Kwt\_tr\_f)) \quad (7)$$

$$IPRrear=PRmax\_r*(1-SURFACE\_MU-(GRADE*Kwt\_tr\_r)) \quad (8)$$

where PRmax_f and PRmax_r are the maximum front and rear initial release pressures, and Kwt_tr_f and Kwt_tr_r are front and rear weight transfer constants.

Figure 4:
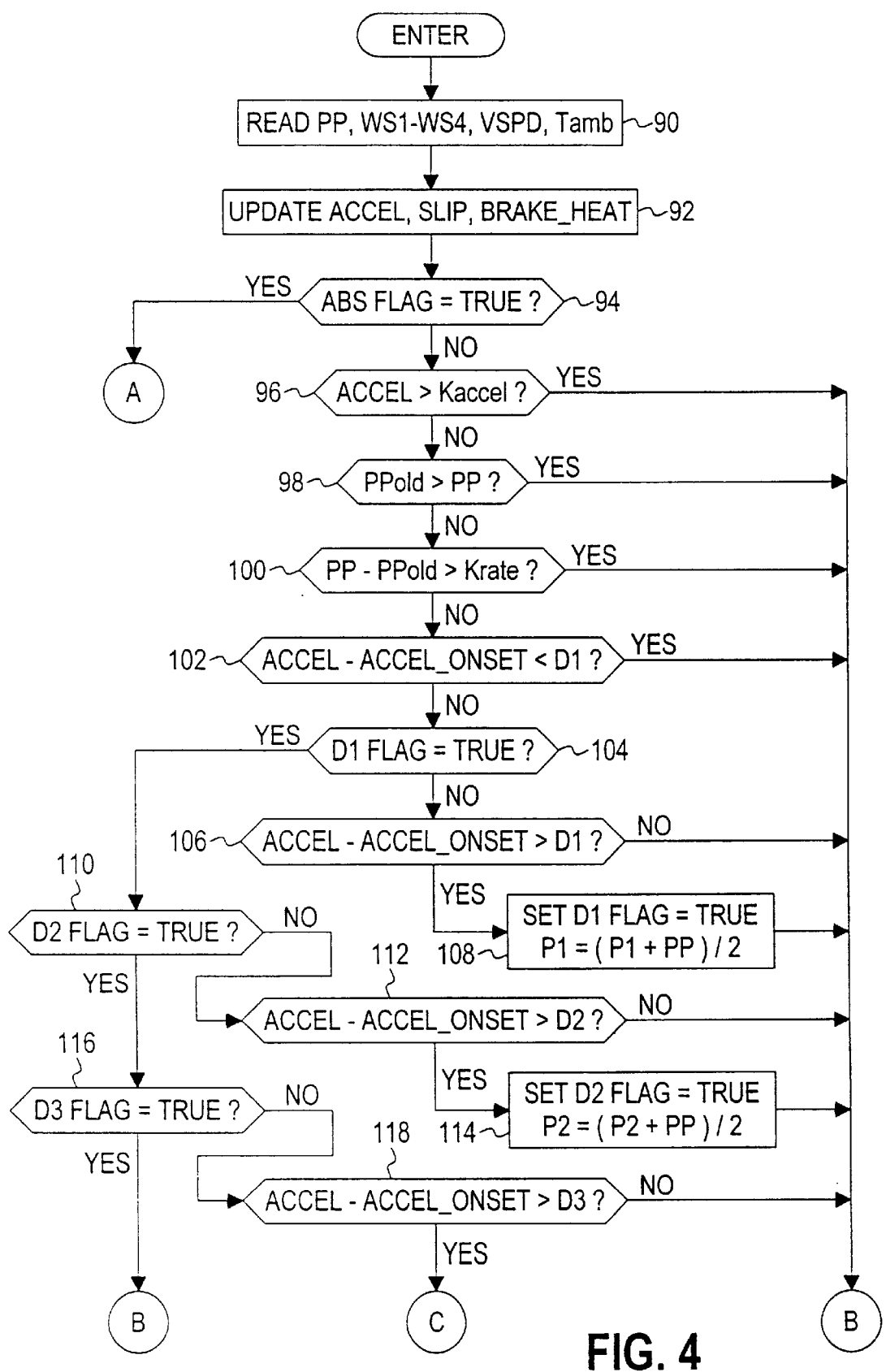
FIGS. 4–5 depict a computer software routine executed by the control unit of FIG. 1 for carrying out the control method of this invention.
Figure 5:
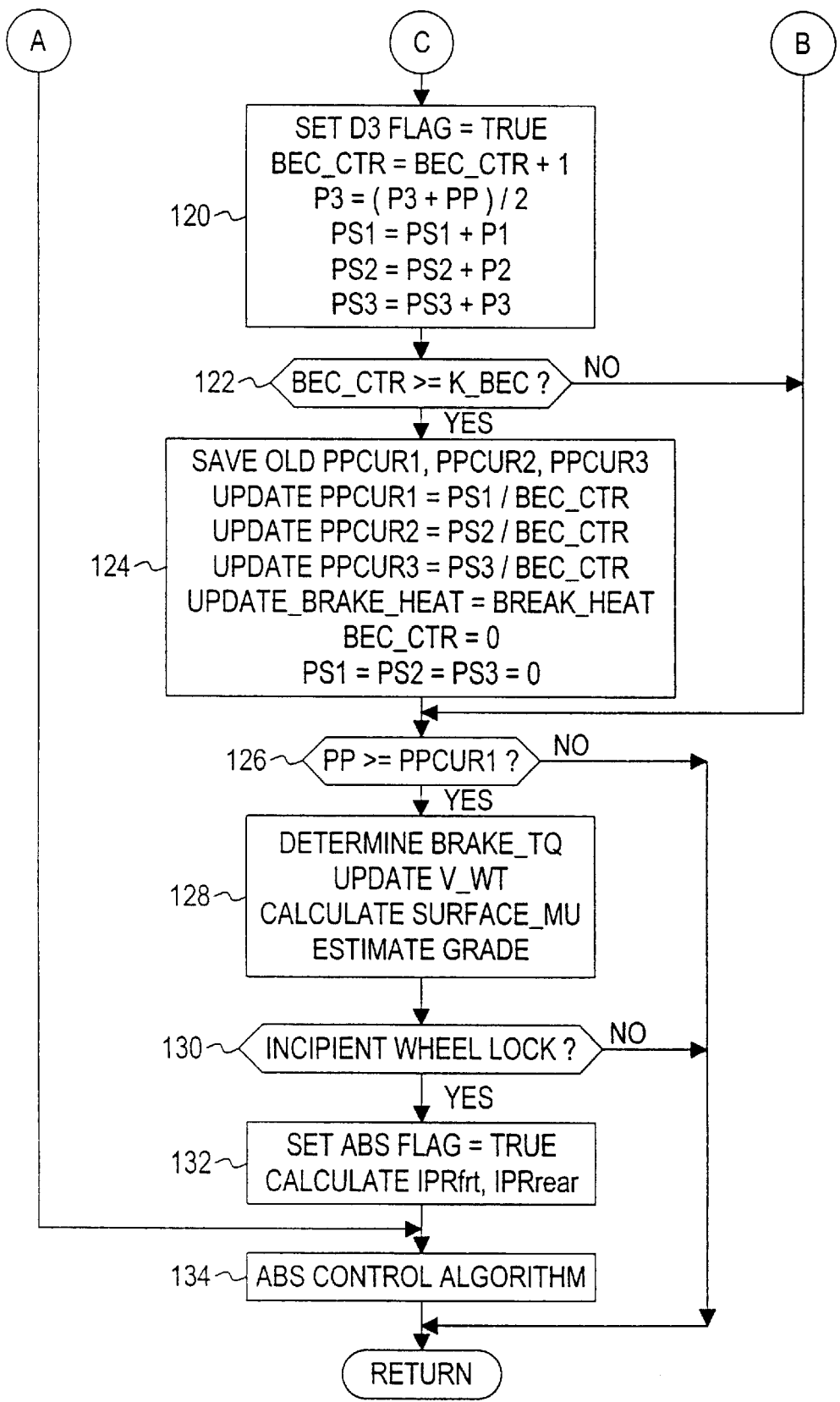

The flow diagram of FIGS. 4–5 depicts a software routine that is periodically executed by control unit 50 of FIG. 1 to collect the braking system characterization data, update SURFACE_MU and GRADE, and determine IPRfrt and IPRrear if insipient wheel lock is detected. Referring to FIG. 4, the input processing blocks 90 and 92 are first executed to read the brake pedal position PP and the wheel speeds (WS1–WS4), to compute the vehicle acceleration ACCEL (compensated for road grade and vehicle weight) and wheel slip, and to update BRAKE_HEAT using equation (2). Also, the vehicle acceleration when the brake pedal is initially depressed is saved as the onset acceleration ACCEL_ONSET. Block 94 then checks the ABS FLAG to determine if anti-lock braking is active. Ordinarily, the ABS FLAG is FALSE, and a portion of the routine comprising the blocks 96–124 is executed to collect braking system characterization data. If insipient wheel lock has been detected, and the modulators 38, 40, 42 have been activated to release brake pressure, the ABS FLAG will be TRUE; in this case, the data collection portion of the routine is skipped, and the block 134 is executed for carrying out the ABS control algorithm, which may be a conventional control for repeatedly releasing and re-applying brake pressure to maximize braking tractive force.

In the data collection portion of the routine, the blocks 96–102 are first executed to detect the presence of braking activity that is suitable for brake system characterization. Block 96 determines if ACCEL exceeds a relatively high threshold acceleration Kaccel, block 98 determines if the previous pedal position PPold is greater than the current value PP, block 100 determines if the difference (PP−PPold)

exceeds a threshold rate Krate, and block 102 determines if the difference (ACCEL−ACCEL_ONSET) is less than the minimum deceleration table entry D1. Each of the blocks 96, 98, 100, 102 must be answered in the negative to proceed with data collection; thus, a "normal" braking condition is defined as one in which (1) ACCEL<Kaccel, (2) PPold<PP, (3) PP−PPold<Krate, and (4) ACCEL−ACCEL_ONSET>D1. Stated oppositely, "normal" braking for purposes of data collection does not include (1) panic braking, (2) high rate brake pedal movement, (3) brake pedal releasing, or (4) deceleration below the linear range of the deceleration vs. pedal position relationship. If at least one of the blocks 96, 98, 100, 102 is answered in the affirmative, the blocks 104–124 are skipped, and the control unit 50 proceeds to block 126, as indicated by the circled letter B.

The data collection blocks 104–124 identify the brake pedal positions P1, P2, P3 corresponding to the respective predefined vehicle deceleration values D1, D2, D3 and periodically update a brake system characterization table corresponding to the graph of FIG. 3. The blocks 104, 110 and 116 respectively determine if the pedal positions P1, P2 and P3 have been identified, based on the status of the D1 FLAG, the D2 FLAG and the D3 FLAG. If block 104 determines that the D1 FLAG is not true, the block 106 determines if the difference (ACCEL−ACCEL_ONSET) has reached the predefined deceleration value identified in FIG. 3 as D1. If not, the data collection portion of the routine is exited; if so, the block 108 sets the D1 FLAG to true, and uses the current value of PP to update the pedal position variable P1 as shown. On the next execution of the routine, block 104 will be answered in the affirmative, and block 110 will determine if the D2 FLAG is true. If not, the block 112 determines if the difference (ACCEL−ACCEL_ONSET) has reached the predefined deceleration value identified in FIG. 3 as D2. If not, the data collection portion of the routine is exited; if so, the block 114 sets the D2 FLAG to true, and uses the current value of PP to update the pedal position variable P2 as shown. The step of constructing and periodically updating the brake system characterization table is suspended if the measured vehicle deceleration exceeds a predefined threshold. On the next execution of the routine, blocks 104 and 110 will both be answered in the affirmative, and block 116 will determine if the D3 FLAG is true. If not, the block 118 determines if the difference (ACCEL−ACCEL_ONSET) has reached the predefined deceleration value identified in FIG. 3 as D3. If not, the data collection portion of the routine is exited; if so, the block 120 sets the D3 FLAG to true, uses the current value of PP to update the pedal position variable P3, increments a brake event counter BEC_CTR, and sums the pedal position variables P1, P2 and P3 with corresponding position summation values PS1, PS2 and PS3. However, if the difference (ACCEL−ACCEL_ONSET) for the braking event fails to reach the deceleration value D3, the block 120 is not executed, and any pedal position data collected during the respective brake application is discarded.

After each successful data collection, the block 122 compares the brake event counter BEC_CTR to a calibrated threshold K_BEC indicative of the number of braking events needed to update the braking system characterization table. Thus, when BEC_CTR reaches K_BEC, the identified pedal position variables P1, P2, P3 for K_BEC (which may have a value of ten, for example) braking events will have been accumulated in the respective position summation values PS1, PS2, PS3. When this happens, the block 124 re-calculates the braking system characterization table values PPCUR1, PPCUR2, PPCUR3 by dividing the respective pedal position summation values PS1, PS2, PS3 by the brake event counter BEC_CTR. In other words, PPCUR1=PS1/BEC_CTR, PPCUR2=PS2/BEC_CTR and PPCUR3=PS3/BEC_CTR. Block 124 also saves the old table values for updating V_WT, stores the current value of BRAKE_HEAT as UPDATE_BRAKE_HEAT, and resets the brake event counter BEC_CTR and the position summation values PS1, PS2, PS3 to zero.

Once the data collection portion of the routine has been completed or exited, the block 126 is executed to determine if the brake pedal position PP is at least as great as the lowest characterization value PPCUR1. If not, the blocks 128–134 are skipped; if so, the block 128 is executed to update the coefficient of friction SURFACE_MU and the road grade GRADE. The brake torque BRAKE_TQ is determined using equation (1), the vehicle weight V_WT is estimated using equations (3) and (4), SURFACE_MU is calculated using equation (5), and GRADE is estimated using equation (6). Block 130 then checks for insipient wheel lock. If insipient wheel lock is not detected, the routine is exited; if insipient wheel lock is detected, the block 132 sets the ABS FLAG to TRUE, and calculates the initial pressure release values IPRfrt, IPRrear using equations (7) and (8), and the block 134 carries out the ABS control algorithm using the calculated initial pressure release values IPRfrt, IPRrear.

In summary, the control of this invention provides a reliable and cost-effective way of optimizing the braking performance of an anti-lock braking system by initially deducing the surface coefficient of friction based on a periodically updated characterization of the braking system performance. Advantageously, the characterization may also be used for diagnosing brake system abnormalities. While described in reference to the illustrated embodiment, it is expected that various modifications in addition to those mentioned above will occur to those skilled in the art. For example, the control is applicable to other types of anti-lock brake systems, and other types of vehicles, including electric or hybrid-electric vehicles that utilize regenerative braking to decelerate the vehicle. Thus, it will be understood that the scope of this invention is not limited to the illustrated embodiment, and that control methods incorporating these and other modifications may fall within the scope of this invention, which is defined by the appended claims.

What is claimed is:

1. A method of operation for a vehicle anti-lock braking system including a driver activated brake pedal and a modulator controlled to initially reduce a braking pressure by a determined initial pressure reduction amount upon detection of an insipient wheel lock condition, the method comprising the steps of:

periodically measuring vehicle deceleration and a brake pedal position during activation of the braking system;

constructing and periodically updating a brake system characterization table representing a relationship between the measured vehicle deceleration and measured brake pedal position;

estimating a road surface coefficient of friction based on the characterization table and changes in the characterization table due to the periodic updating;

revising said initial pressure reduction amount based on the estimated road surface coefficient of friction upon detection of the insipient wheel lock condition;

periodically determining a brake temperature; and compensating the estimated road surface coefficient of friction for variations in the determined brake temperature.

2. The method of claim 1, wherein the step of estimating the road surface coefficient of friction includes the steps of:

estimating a braking torque during activation of the braking system based on said characterization table and the measured brake pedal position;

periodically updating a vehicle weight estimate based on said changes in the characterization table; and estimating the road surface coefficient of friction based on the estimated braking torque and the vehicle weight estimate.

3. The method of claim 2, including the steps of:

storing the determined brake temperature when the characterization table is updated;

compensating the estimated braking torque based on a difference between the stored brake temperature and a value of the determined brake temperature when the braking torque is estimated; and compensating the updating of the vehicle weight estimate based on a difference between the stored brake temperature and a value of the determined brake temperature when the vehicle weight estimate is updated.

4. The method of claim 1, wherein the vehicle has front and rear wheels, and the method includes the steps of:

estimating a road grade; and compensating the initial pressure reduction amount for a weight transfer among the front and rear wheels due to the estimated road grade.

5. The method of claim 1, including the step of:

disabling the step of constructing and periodically updating the brake system characterization table when the measured brake pedal position increases at a rate in excess of a reference rate.

6. The method of claim 1, including the step of:

disabling the step of constructing and periodically updating the brake system characterization table if the measured vehicle deceleration is less than a predefined threshold.

7. The method of claim 1, including the step of:

suspending the step of constructing and periodically updating the brake system characterization table when the measured brake pedal position decreases during the braking system activation.

8. The method of claim 1, including the step of:

suspending the step of constructing and periodically updating the brake system characterization table if the measured vehicle deceleration exceeds a predefined threshold.

9. A method of operation for a vehicle anti-lock braking system including a driver activated brake pedal and a modulator controlled to initially reduce a braking pressure by a determined initial pressure reduction amount upon detection of an insipient wheel lock condition, the method comprising the steps of:

periodically measuring vehicle deceleration and a brake pedal position during activation of the braking system;

constructing and periodically updating a brake system characterization table representing a relationship between the measured vehicle deceleration and measured brake pedal position;

estimating a road surface coefficient of friction based on the characterization table and changes in the characterization table due to the periodic updating;

revising said initial pressure reduction amount based on the estimated road surface coefficient of friction upon detection of the insipient wheel lock condition;

wherein the step of estimating the road surface coefficient of friction includes the steps of:

estimating a braking torque during activation of the braking system based on said characterization table and the measured brake pedal position;

periodically updating a vehicle weight estimate based on said changes in the characterization table; and estimating the road surface coefficient of friction based on the estimated braking torque and the vehicle weight estimate.

* * * * *